United States Patent [19]

Spektor et al.

[11] Patent Number: 4,764,778
[45] Date of Patent: Aug. 16, 1988

[54] INTENSITY CONTROLLER FOR AN APERTURE CARD PLOTTER

[75] Inventors: Semyon Spektor, San Francisco; Michael H. Ranger, San Jose, both of Calif.

[73] Assignee: NCR Corporation, Dayton, Ohio

[21] Appl. No.: 42,406

[22] Filed: Apr. 24, 1987

[51] Int. Cl.⁴ .............................................. G01D 15/00
[52] U.S. Cl. ..................................... 346/160; 346/154
[58] Field of Search ................. 350/358, 300; 346/160, 346/154, 108, 107 R; 101/DIG. 13; 400/119; 364/518–521

[56] References Cited

U.S. PATENT DOCUMENTS 4,477,821 10/1984 Yamamoto et al. ................ 346/160

Primary Examiner—Arthur G. Evans
Attorney, Agent, or Firm—Wilbert Hawk, Jr.; Edward Dugas; Jack R. Penrod

[57] ABSTRACT

A system for controlling the intensity of a scanning laser beam used to plot a computer-output microfilm image on an aperture card. The intensity of the beam is controlled by an acousto-optic modulator, which varies the light contained in various components of the modulated output. The first order beam is used for scanning the microfilm because it can be varied from its maximum intensity down to essentially cut-off without requiring large amounts of modulator drive. The intensity control is accomplished in two stages. First, before each scan across the microfilm, a known fraction of the first order beam is split off and sensed for intensity level. This level is directly proportional to the scan beam intensity. The sensed level is then compared to a preset voltage representing the proper exposure operating point for that manufacturer's microfilm characteristics. An error signal is produced by the comparison and is fed into a hold circuit. During this non-microfilm scanning portion of the cycle, the error signal updates the modulator drive level to continuously vary the modulated beam intensity in a way to minimize the error signal, thus, in closed-loop fashion the scan beam intensity is controlled to the proper exposure operating point. Second, as each scan line of the microfilm begins, the hold circuit is switched to "hold" mode so the intensity level sensed before the scan is the level that is held during the subsequent scan. During the scan, pixel data is modulated to the "held" intensity level in order to control the modulation of the scan beam intensity to the operating level. By modulating the beam in a purely binary fashion according to pixel data as it scans across the microfilm, a microfilm image is reproduced.

15 Claims, 10 Drawing Sheets

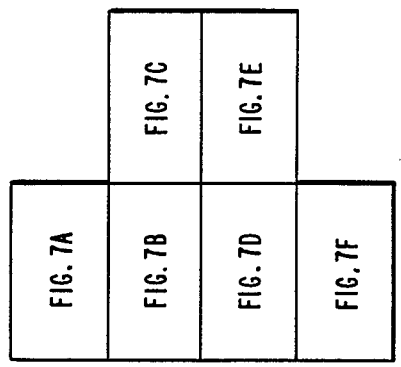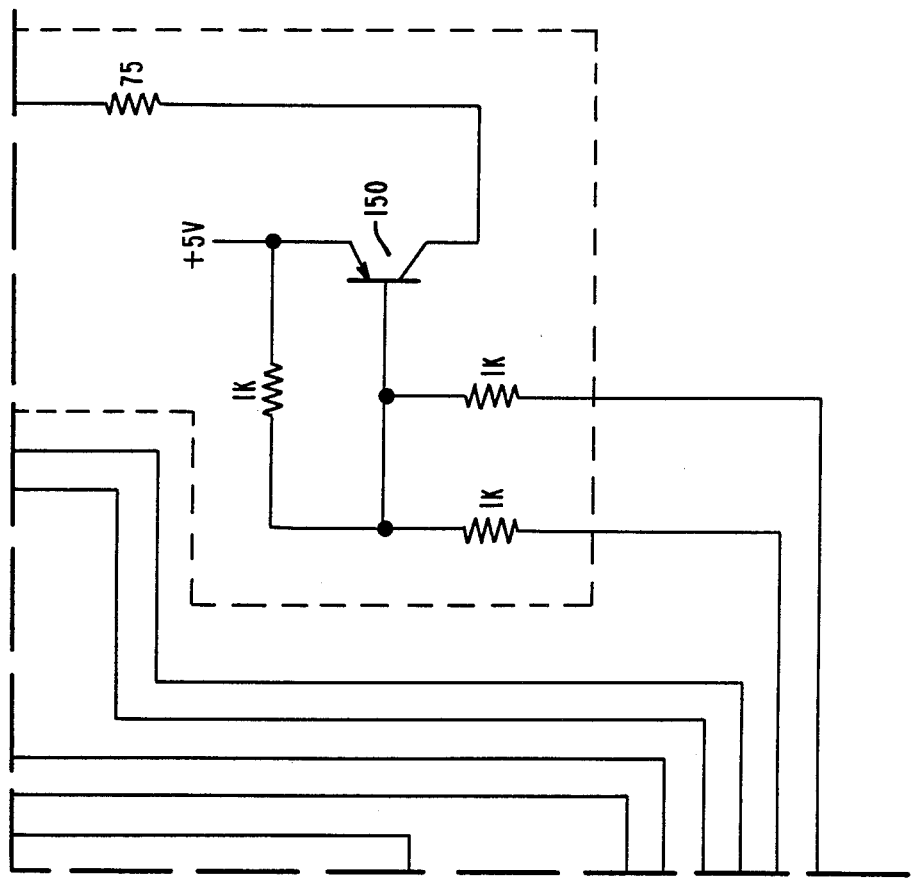

INTENSITY CONTROLLER FOR AN APERTURE CARD PLOTTER

BACKGROUND OF THE INVENTION

This invention relates to the field of recording or imaging systems and more particularly to an intensity controller for a laser, computer-output-microfilm (COM) plotter.

Lasers, because of their narrow beam width, low beam divergence, and high energy density, have found wide application in image recording upon photo-responsive media. U.S. Pat. No. 3,858,004, issued Dec. 31, 1974, and U.S. Pat. No. 4,197,560, issued Apr. 8, 1980, are two examples of the use of modulated laser beams for recording latent images on a xerographic photo-receptor in a facsimile printer. The laser in each of the above mentioned patents is scanned across the photo-receptive surface by a mirror while being intensity modulated in order to produce scans of light areas, dark areas, and half-tone areas. When one scan of the laser is complete, a subsequent scan is performed in close proximity to the previous one. The sequential reproduction of all the scans creates a copy of a facsimile transmitted document very much like a television picture is reproduced. In order to make a good reproduction of the facsimile transmitted document, the intensity level of the laser, between the lightest printing level, and the darkest printing level must be within the dynamic range of the photo-receptor. Therefore, it is necessary to provide such printers with an intensity control to set the intensity of the printing or writing beam to a predetermined operating point within the dynamic range of the photo-receptor about which the intensity may be modulated.

The two above-mentioned patents each disclose an intensity controller system which uses a number of neutral density filters for attenuating the laser beam to various levels. These filter elements are mounted within a rotary mechanism which is rotated to supply various degrees of filtering. After filtering, a portion of the beam is split off and directed to a photodiode to produce an output signal proportional to the intensity of the beam. This output signal is compared with one of a number of predetermined levels, each corresponding to different photo-receptor characteristics of the facsimile system. If the intensity proportional signal does not substantially equal the predetermined level selected then, another filter with either a greater or lesser attenuation is subsequently rotated into position in order to provide a filtered beam of the desired intensity. Systems such as these not only require a lot of extra hardware, space and care, but also require long response times in order to switch and stabilize at the appropriate intensity level. The problem with such a system is that it is too slow and too cumbersome to be applied to a high resolution, aperture card, computer-output-microfilm plotter.

U.S. Pat. No. 4,612,555, issued Sept. 16, 1986, and U.S. Pat. No. 4,613,877, issued Sept. 23, 1986, illustrate the application of laser beam scanners to laser standard size page printing systems. The laser used in each of these systems is a solid state laser. Solid state diode lasers are known for having very small beam generating regions within each specially constructed semiconductor diode. Because the laser beam is generated by a small region, instead of a long path of stimulated emission as in a helium-neon laser, the divergence of the coherent beam is considerably greater than that of gas lasers. The problem of such a design is that extra optical components and thus expense would be required in order to achieve the high resolution necessary for an aperture card COM plotter if a solid state laser were used. Further, a solid state laser which emits light of the wavelength required to properly expose the microfilm is not commercially available.

Industry standards require that an aperture card COM plotter have the same or better resolution, upon reproduction of the recorded drawing to full size, as required of a plotter for producing a full size drawing. Industry standards further dictate that a full size drawing generated by the full size plotter have a resolution of at least 200 dots per inch for the maximum size drawing. Since, in an aperture card plotter, for the worst case, a drawing is reduced by a factor of 30-to-1 in order to be recorded on microfilm, a resolution of 6,000 dots per inch or more is required for a COM plotter of this type.

The designs of other known intensity controllers used in laser printers have higher degrees of complexity, and higher numbers of components, yet do not print at sufficient resolutions to be used for an aperture card plotter. Such systems are not instructive with regard to the design of an intensity controller for an aperture card plotter with high resolution, compact, and straightforward optics.

U.S. Pat. No. 3,787,887, issued Jan. 22, 1974, uses optical components which are both spatially large and responsively slow in order to vary the reflection of a device which has a variable polarization. Since a light beam will be almost totally reflected from a medium having a polarization that is orthogonal to that of the incident light beam, the intensity can be adjusted by varying the polarization direction and thus varying the portion reflected of an incident laser beam. It can be seen that in order to operate properly, the laser of U.S. Pat. No. 3,787,887 must maintain a relatively stable polarization orientation of its output beam. If the laser output beam polarization orientation varies significantly with respect to time, this intensity control mechanism is incapable of responding rapidly enough to perform its function. Small, inexpensive gas lasers, which are desirable from cost and beam-width consideration, exhibit randomly changing polarization of their output beams during warm-up, therefore; if plotter operation is required during the warm-up cycle, an intensity controller which is not independent of the light source polarization presents a problem.

Another type of intensity control system shown in U.S. Pat. No. 4,378,490, issued Mar. 29, 1983, uses any type of light source. The intensity control of this patent operates with coherent, noncoherent, polarized, or nonpolarized light sources. The problem of this design, however, is that it uses a physically large controllable attenuator. In order to be modulated by the large, controllable attenuator the source beam must be broadened to a similar physical size. This creates a resolution problem because once the beam is greatly broadened, expensive and powerful optics are required to gather the energy back to a spot that is no bigger than the 1/6000 th of an inch, which as described previously is a requirement for a COM plotter of this type. It is therefore desirable to have an intensity controller that does not require a great broadening of the system light beam in order for the controllable modulator and/or attenuator to operate.

U.S. Pat. No. 3,705,758, issued Dec. 12, 1972, shows an intensity controller system which is designed to broaden the spot generated by the laser system by a distributed optical filter. The purpose of the wider spot so formed, is to provide better data reading and data writing capabilities to a thermally sensitive data recording disk. The system of this patent is designed not to produce narrow spots, but to produce wide spots efficiently. To this end, this patented system utilized anti-reflective coatings on all optical surfaces. It is desirable to use anti-reflective coatings to reduce reflective losses in a high resolution system.

Other complex intensity controller systems are disclosed in U.S. Pat. No. 4,629,879, issued Dec. 16, 1986; U.S. Pat. No. 4,562,567, issued Dec. 31, 1985; and U.S. Pat. No. 4,581,617, issued Apr. 8, 1986. In each of these three patents the modulated beam must travel a respective complex optical path before the beam reaches the intensity sensor. Further, these three patents all manifest the problem of unnecessarily complex intensity control devices. It is desirable to keep the optical path and the control apparatus as simple as possible in order to keep costs down.

SUMMARY OF THE INVENTION

Briefly stated, according to one aspect of the invention, solutions to the aforementioned problems are achieved by providing an intensity controller for a high resolution laser plotter comprising a laser light source emitting a light beam; acousto-optic modulator means for modulating the light beam; isotropic beam-splitter means for splitting the modulated beam into a write beam and a reference beam; light sensing means for generating a signal proportional to the reference beam intensity mounted in the path of the reference beam; a sample-and-hold circuit connected to and sampling the reference beam intensity signal; and a modulator circuit means, having an input connected to the sample-and-hold circuit and an output connected to acousto-optic modulator means, for driving the acousto-optic modulator for providing the modulated beam with a controlled intensity.

It is an object of this invention to provide an intensity controller system for a high resolution plotter which is substantially unaffected by random polarization orientation changes of the source beam.

It is a further object of this invention to provide an intensity controller that is substantially unaffected by random polarization of the beam, which uses an isotropic, transparent, beam-splitter to provide a reference beam.

It is another object of this invention to provide an intensity controller as described above with an anti-reflective coating, on the beam-splitter surface from which the beam emerges, in order to reduce reflection therefrom.

It is another object of this invention to provide an intensity controller which is simple, inexpensive, and responsive for application to a high resolution, COM plotter.

BRIEF DESCRIPTION OF THE DRAWINGS

FIGS. 7A, 7B, 7C, 7D, 7E and 7F when assembled according to the map of FIG. 7 show a detailed schematic diagram of an intensity controller electronic circuit.

DETAILED DESCRIPTION

The invention is an intensity controller for a COM aperture card plotter. A plotter of this type is described in U.S. Pat. No. 4,613,876, issued Sept. 23, 1986, and assigned to NCR Corporation, the description of which is hereby incorporated by reference. The incorporated patent describes, among other things, how the film of an aperture card can be bent into an arcuate surface in order to provide a circular scanning path which has a uniform radial focal length, so details of how the microfilm bearing, aperture card is held will not be further addressed in this application.

Figure 1:
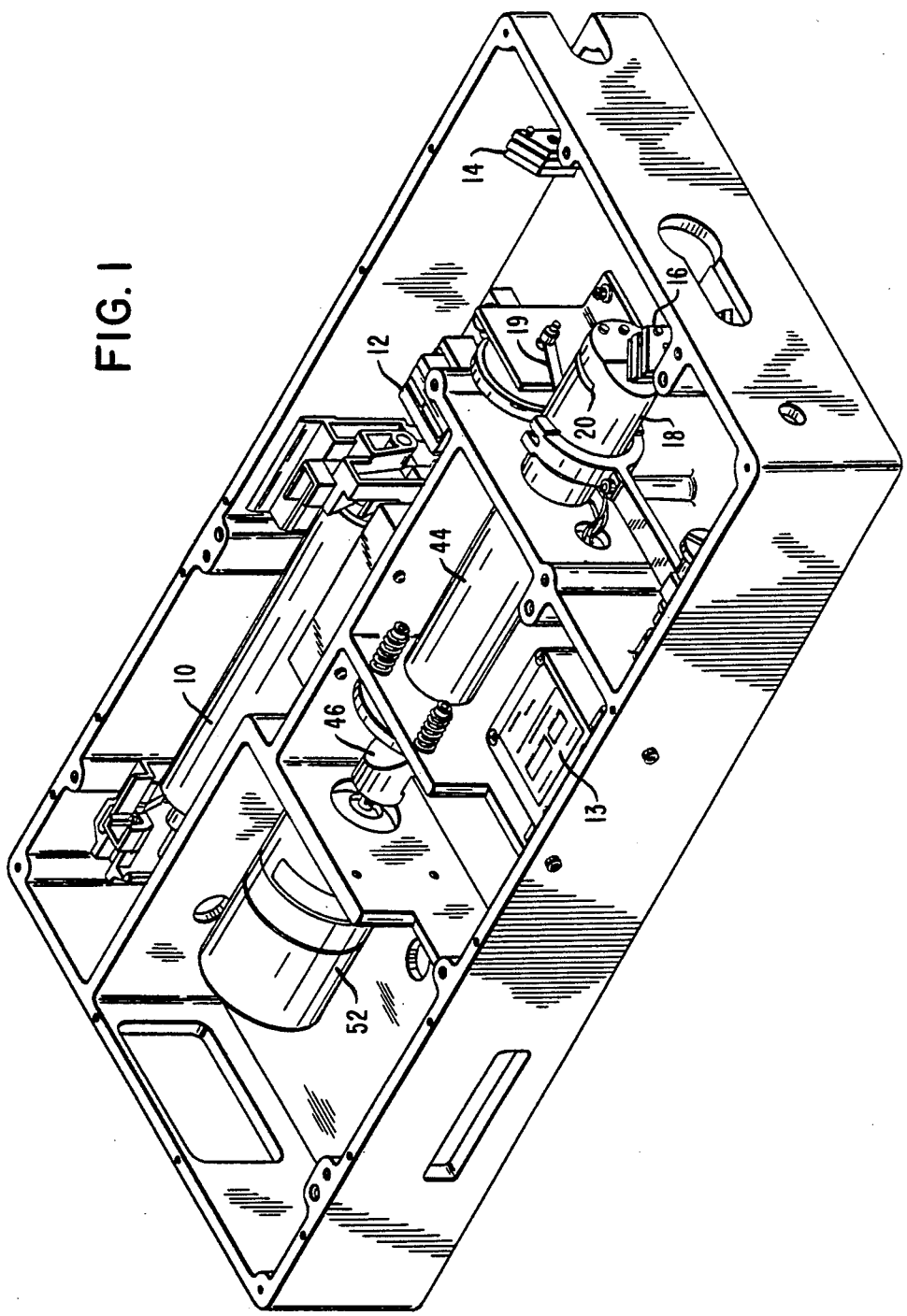
FIG. 1 is a perspective view of the bottom portion of a COM plotter which contains all but the final portion of the optical path.
Figure 2:
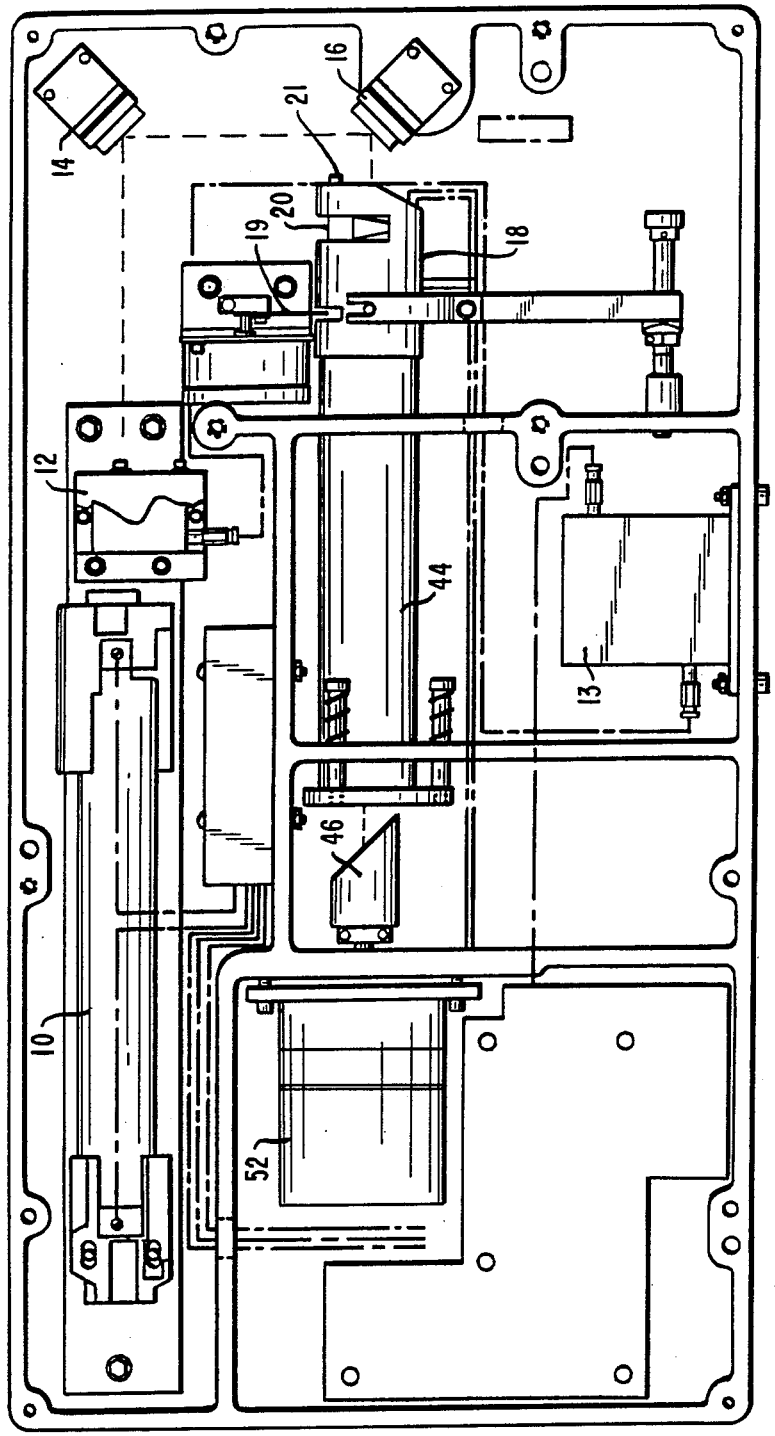
FIG. 2 is a plan view of the bottom portion of the plotter shown in FIG. 1.

Referring now to FIGS. 1 and 2, which illustrate the optical path beneath the microfilm aperture card carrier, a HeNe gas laser 10, such as a Siemens model LGR 7641, emits a beam of 632 nanometer, coherent light at a power level of 1.25 mw. The beam traverses a short distance from laser 10 and subsequently enters an acousto-optic modulator 12, such as a Crystal Technology Division, Siemens Corporation model number 3080-16, where the beam is modulated (as will be explained below) to provide a controllable intensity beam.

The modulated beam is emitted from acousto-optical modulator 12, where it is reflected by a first, front surface mirror 14 and then a second, front surface mirror 16. Each mirror is oriented at a 45° angle with respect to the incident beam, and reflects the incident beam by 90°, according to known physical principles, resulting in a total reflected direction change of 180°.

The acousto-optic modulator 12 is excited by acousto-optical driver 13, and modulates the beam, in a known way, by the interaction of laser light rays with a vibrating, transparent medium into a composite of a zero order beam, a first order beam, and higher order beams. Each order beam diverges away from the other order beams as a function of the distance from the modulator 12. Thus, after traveling from the modulator 12 and reflecting mirrors 14, 16, the composite beam is comprised of a group of horizontally-spaced beams, which show up as a series of dots on a beam-splitter housing 18. The first order beam is allowed to enter housing 18 through aperture 22 (shown in FIG. 3), but all other beams are rejected, thus housing 18 and aperture 22 perform the function of a spatial filter on the composite beam.

Figure 3:
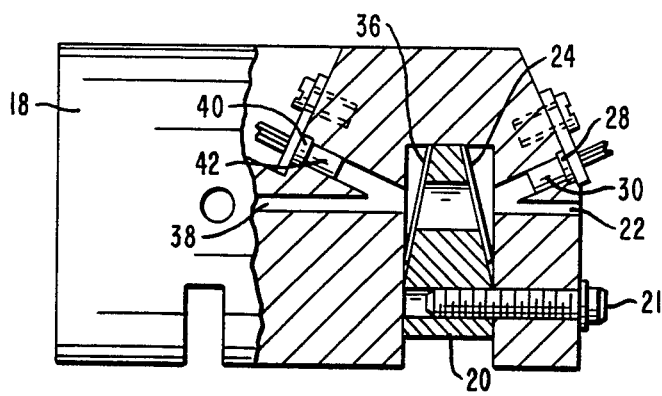
FIG. 3 is a partially cut-away view of the intensity sensor housing in which the intensity beam-splitter is mounted.
Figure 4:
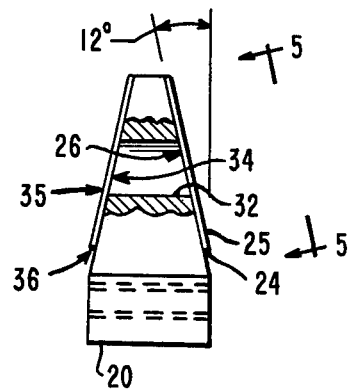
FIG. 4 is a section view of the mounting block for the intensity and the focus beam-splitters.
Figure 5:
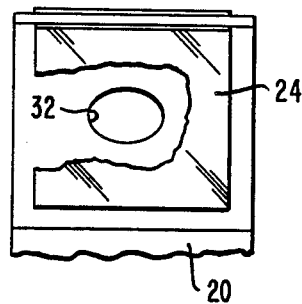
FIG. 5 is a detailed view taken in the direction of 5—5 shown in FIG. 4 to illustrate the mounting of the intensity beam-splitter upon the block.

Referring now to FIGS. 3, 4 and 5, the operation of the beam-splitters will be described. Inside housing 18, mounting block 20 is secured by a bolt 21 as shown in FIG. 3. Mounting block 20 has an inclined surface of 12° on one end, as shown in FIG. 4, upon which the intensity beam-splitter 24 is mounted. The beam-splitter 24 in the preferred embodiment is optical glass, although those skilled in the art will recognize that other transparent media may be used. Light entering through aperture 22 in housing 18 will strike the first surface of beam-splitter 24. Since glass has a higher index of refraction than air, an interface exists at which the beam will be partly transmitted and partly reflected, thus splitting the beam into: a beam which is used for writing information on a microfilm card; and a reference beam, which is proportional to the write beam. The reference beam is sensed to provide an intensity control input. The proportion transmitted and the proportion reflected at the interface is a function of the index of refraction of air, the index of refraction of the beam-splitter glass, and the angle of incidence of the beam as is well known from physical principles.

The use of an isotropic, transparent media such as glass has many advantages over other types of beam-splitters. A commonly used other type, is a non-isotropic beam-splitter called a half silvered mirror, which is basically an isotropic, transparent media with a partial reflective coating on the outside surface. Where the reflective coating is on the surface the incident beam is efficiently reflected, and, as discussed previously, where there is no reflective coating, the transparent media interface partially reflects and partially transmits the incident beam. The main problems of a partially reflecting mirror beam-splitter are: expense, inefficiency of transmission of the write beam, and non-uniformity of the reflective coating deposition on the beam-splitter surface. All of these problems are obviated by applicants' simple, inexpensive, and efficient, isotropic glass beam-splitter.

A second effect that occurs, whenever an isotropic, transparent beam-splitter is used, is known from Fresnel's equations. Fresnel's equations provide expressions for the reflection coefficients of incoming polarized light as a function of the orientation of the electrical field vector and as a function of the angle of incidence of the beam upon the beam-splitter surface. According to Fresnel's equations, light of some polarities will be more readily transmitted through the glass than reflected. Since the laser 10 of the preferred embodiment emits randomly polarized light, especially during the first few hours after being turned on, applicants' invention must provide a design which reduces to insignificant the interaction between a randomly polarized laser beam and the polarization dependent coefficients of the beam-splitter glass. According to Fresnel's equations, the reflection coefficients are primarily a function of the angle of incidence, therefore, by designing a mounting which holds the beam-splitter at a 12° angle from a vertical direction, as shown in FIG. 4, the worst case effect of random polarization upon the beam-splitter would be a change of three percent of the ratio of the reflected light beam intensity to the transmitted beam intensity. Maximum variations of three percent due to random polarization orientations have, by experimental testing, proved to be acceptable for a beam-splitter of an intensity controller.

The reflected or reference beam caused by the beam-splitter 24 shines upon a transparent body 30 of a photo-transistor 28 which is mounted in beam-splitter mounting block 18, as shown in FIG. 3.

The write beam continues through the intensity beam-splitter 24 and exits the second surface 26, which is treated with an anti-reflective coating. The coating reduces the reflections as the write beam passes from the high index of refraction of glass into the lower index of refraction of air. Reflections from second surface 26 give false intensity indications due to optical interference with the first surface beam at intensity photo-transistor 28. Such interference would be very unpredictable in a production environment because it critically depends upon the thickness of the beam-splitter glass and the angle of incidence.

As the write beam emerges from second surface 26 of the intensity beam-splitter 24, it is refracted parallel to the optical path direction before entering the intensity beam-splitter 24, and into a circular passage way 32. At the end of passage way 32 the write beam enters a focus beam-splitter 36 at an inner surface 34, which as will be explained below, has an anti-reflective coating upon it. Upon emerging from the outer surface 35 of focus beam-splitter 36 the write beam is refracted to travel substantially the path it would have taken had not the beam-splitters 24, and 36 been present. The write beam then exits housing 18 through a passageway 38.

Referring again to FIG. 1 and FIG. 2, after leaving the beam-splitter housing 18, the write beam enters the focusing tube 44 which contains lenses for focusing the beam to a five micron diameter spot at the aperture card surface. When the write beam emerges from the focusing tube 44 it strikes a scanning mirror 46, which rotates 360° at a constant rate. The scanning mirror 46 thus sweeps the reflected beam constantly in a 360° circle. The optical path is closed by a shutter 19 (shown in FIGS. 1 and 2) during aperture card loading and positioning to keep the light beam away from the microfilm aperture cards until exposure is desired.

Scanning mirror 46 is mounted upon a rotary shaft of a brushless DC motor/shaft-position-encoder 52. Motor/encoder 52 not only provides the power to keep the scanning mirror spinning, but also provides a pulse output defining where the beam is being reflected to, in order to coordinate the scanning of the write beam with the electronic intensity control circuitry shown in FIGS. 6, and 7A through 7F.

Figure 6:
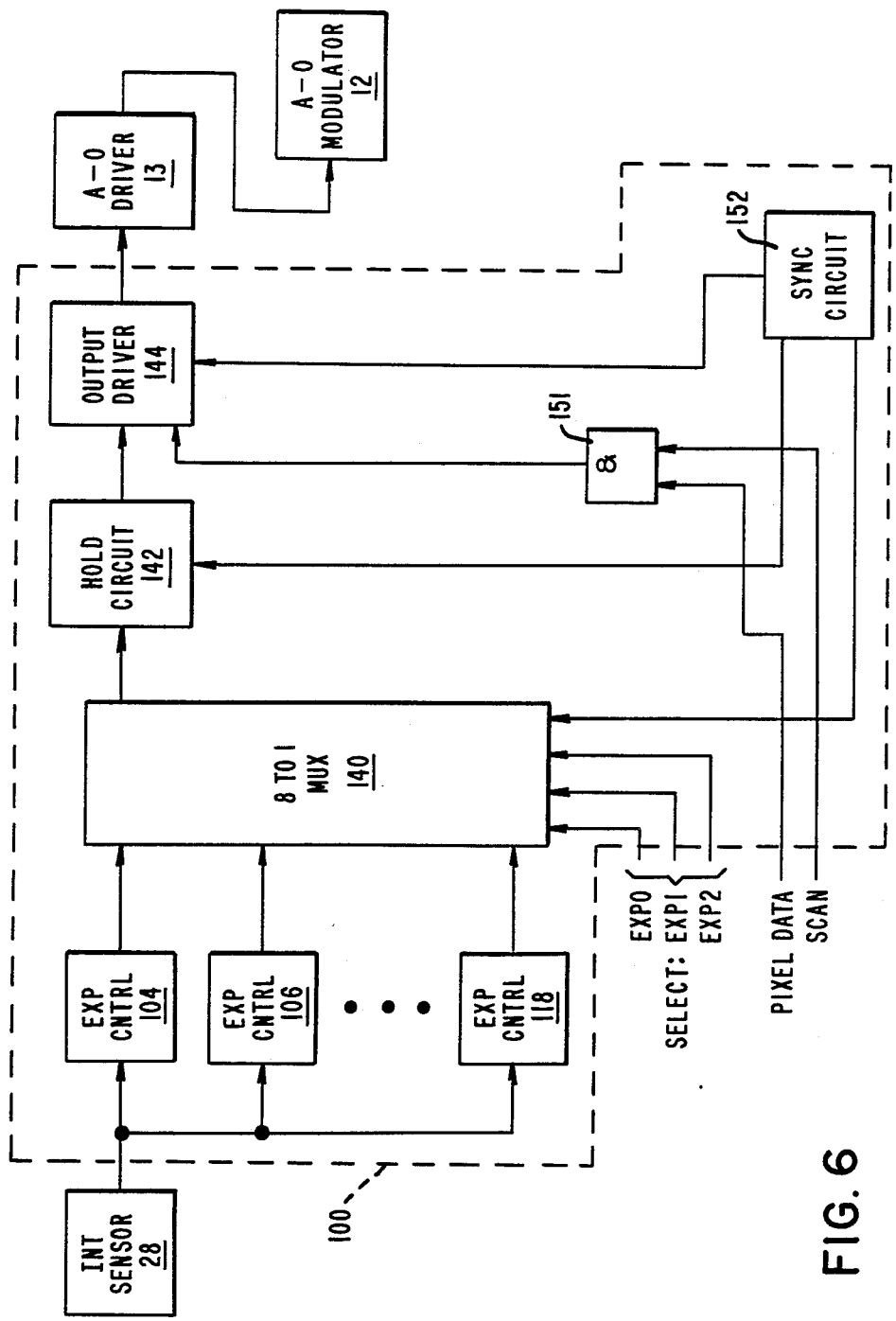
FIG. 6 is a simplified block diagram of the intensity controller electronic circuit functions.

FIG. 6 illustrates in block diagram form the intensity controller circuit 100, one embodiment of which is shown in FIGS. 7A, 7B, 7C, 7D, 7E and 7F. The intensity controller 100 is connected to the intensity photo transistor 28, such as a photo transistor type OP-500, which provides an electrical signal that is proportional to the intensity of the reference beam shining upon it. The output of the intensity sensor 28 is connected in parallel to a number of exposure control comparators 104, 106, 108, 110, 112, 114, 116, and 118, such as type LM339. Each exposure control comparator compares the sensor signal to a preset d.c. level. Each preset level is different and corresponds to an intensity of the write beam which will produce the correct exposure for recording on a corresponding type of aperture card microfilm. The output of each of the exposure control operational amplifiers goes to one input of an eight-to-one multiplexer 140; such as Motorola type MC14529B, which has tri-state outputs each of which may provide a logic 0, a logic 1, or a high series impedance according to the input logic levels. The three exposure select lines EXP0, EXP1, and EXP2, determine which of the exposure control amplifiers will be selected to provide the output of the multiplexer.

The output of the multiplexer 140 is connected to a hold circuit 142 which, during the approximately 338° of the 360° rotation of the scanning mirror that the light beam is not recording upon the aperture card microfilm, continuously adjusts the intensity to the fixed value determined by the selected exposure comparator. At the end of this approximately 338° the final value is subsequently held for the remaining, approximately 22° as the intensity operating point. This method is acceptable because the scan time for the 22° representing the picture area is approximately 1 millisecond, while the period of laser output intensity variations is on the order of 15 seconds. It should be noted that, during the approximately 338° non-recording portion, the final value in the hold circuit 142 is coupled through an output driver 144 to the acousto-optical driver 13 and the acousto-optical modulator assembly 12. This provides a closed loop control system when the laser beam is on because the beam intensity level is sensed by photo transistor sensor 28, compared to a reference level to determine if it is too bright or too dim, and the intensity is reduced or increased by the result of the comparison driving the modulator 12.

During the 22° writing scan of the aperture card microfilm this hold circuit value is held by essentially disconnecting the tri-statable multiplexer output. This is accomplished by the sync circuit 152 impressing a logic 0 on an input of AND gate 139 and 141, respectively, which subsequently induces both outputs of MUX, 140, to the high series impedance condition. The held value is one input which is used to define the operating point of output driver 144. A second input to the output driver 144 is the pixel data which is "clocked" out of a computer such as a CAD/CAM system. The pixel data is also synchronized to the rotation of the rotating mirror 46 by timing pulses on lines 147 and 149 from the encoder portion of motor/encoder 52 via an AND gate 151 and a sync circuit 152. One of the signals derived from the encoder signals is a blanking pulse which drives the driver 13 and the acousto-optical modulator 12 to cut off, momentarily, so that the initial edge of the microfilm image for each scan will be synchronized with the initial edge for all other scans on the microfilm. After the blanking pulse is over, the pixel data for that scan is written onto microfilm.

Figure 7A:
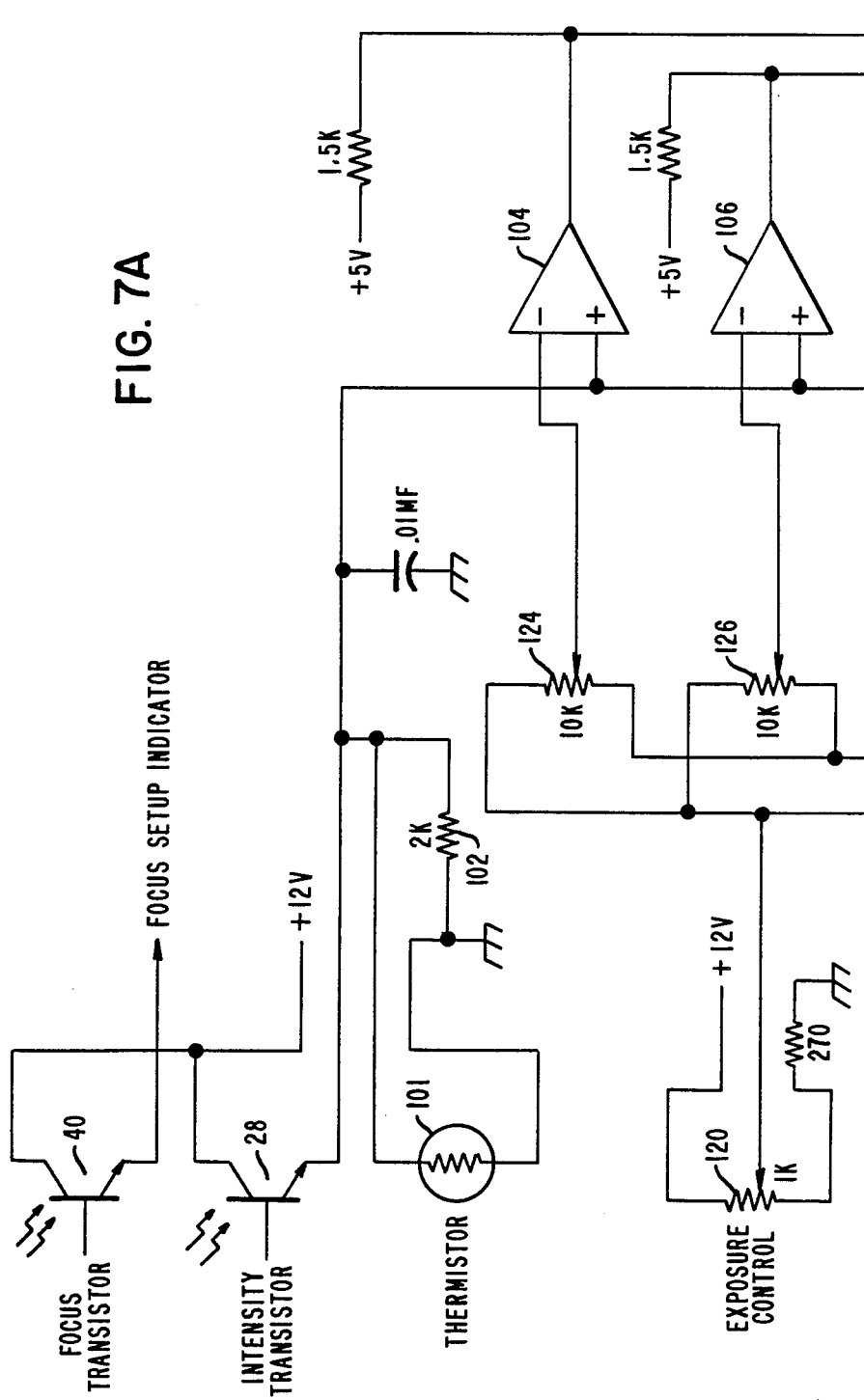
Figure 7B:
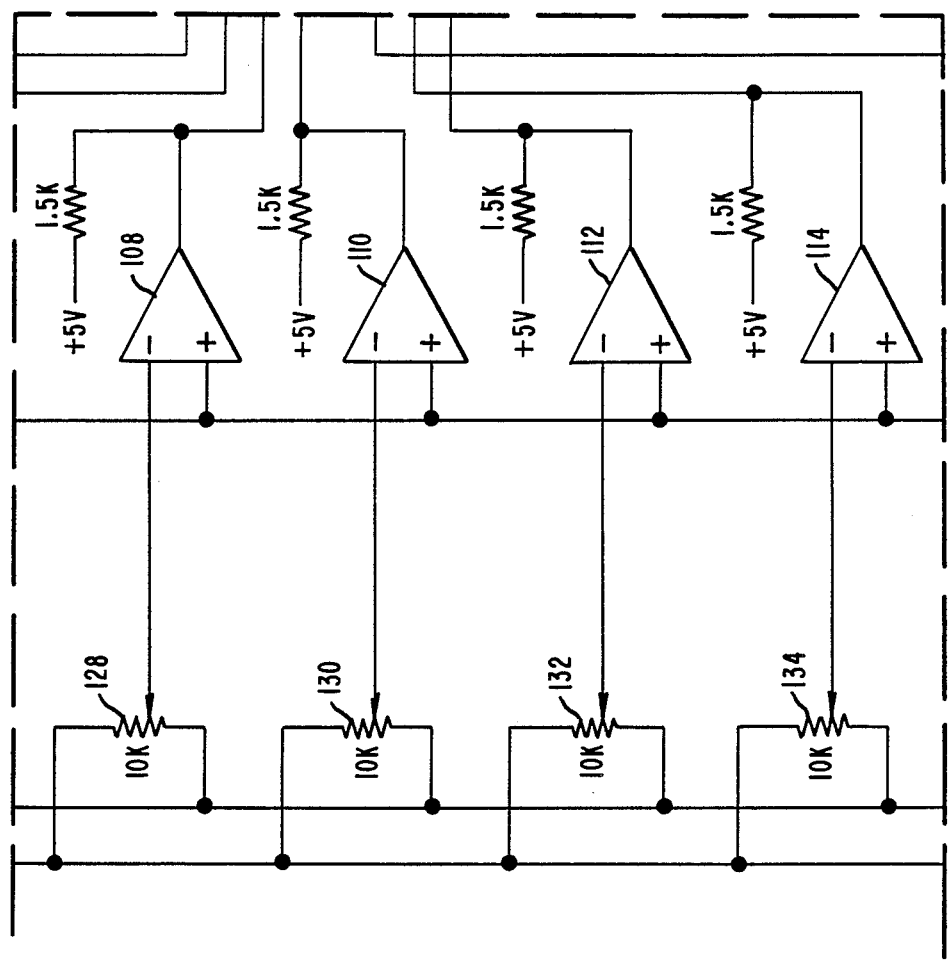

FIGS. 7A, 7B, 7C, 7D, 7E and 7F show one embodiment of the intensity control circuit 100. The intensity photo transistor 28 is shown in FIG. 7A connected in a common collector mode with an output resistor consisting of the combination of a 2K resistor 102 in parallel with a negative temperature coefficient (NTC) thermistor 101. NTC thermistor 101 is mounted in close proximity to photo transistor 28 and compensates for the increase in gain of intensity photo transistor 28 as the temperature increases. The output of the intensity photo transistor 28 is connected to the non-inverting input of comparators 104, 106, 108, 110, 112, 114, 116, and 118. The inverting inputs of each of these comparators is connected to a respective voltage divider 124, 126, 128, 130, 132, 134, 136, and 138 which are supplied a constant reference d.c. level by a potentiometer resistor 120 and a capacitor 122. Each voltage divider 124 through 128 is adjusted to correspond to an exposure index of a type of aperture card microfilm used as a recording medium. The output of each comparator 104–118 is zero volts if the voltage divider reference is greater than the intensity photo transistor voltage, or 5 volts if the intensity photo transistor voltage is greater than the voltage divider reference.

The eight operational amplifier outputs which are either 0 or 5 volts are supplied to a dual 4-to-1 multiplexer 140, such as a Motorola type MC14529B, which is connected as a single 8-to-1 multiplexer. Select lines EXP0 and EXP1 select one of four outputs from each of the dual sections to be switched respectively to output 1 and output 2 which are wire "OR'ed". Select line EXP2 using gates 137, 139 and 141 selects output 1 or output 2, depending upon which of these two outputs is not caused to assume a high impedance state by the logic levels of enable inputs EN1 and EN2 which are connected to the gates 139 and 141. Thus of the eight inputs only one will be selected as the input to a hold network 142.

Figure 7C:
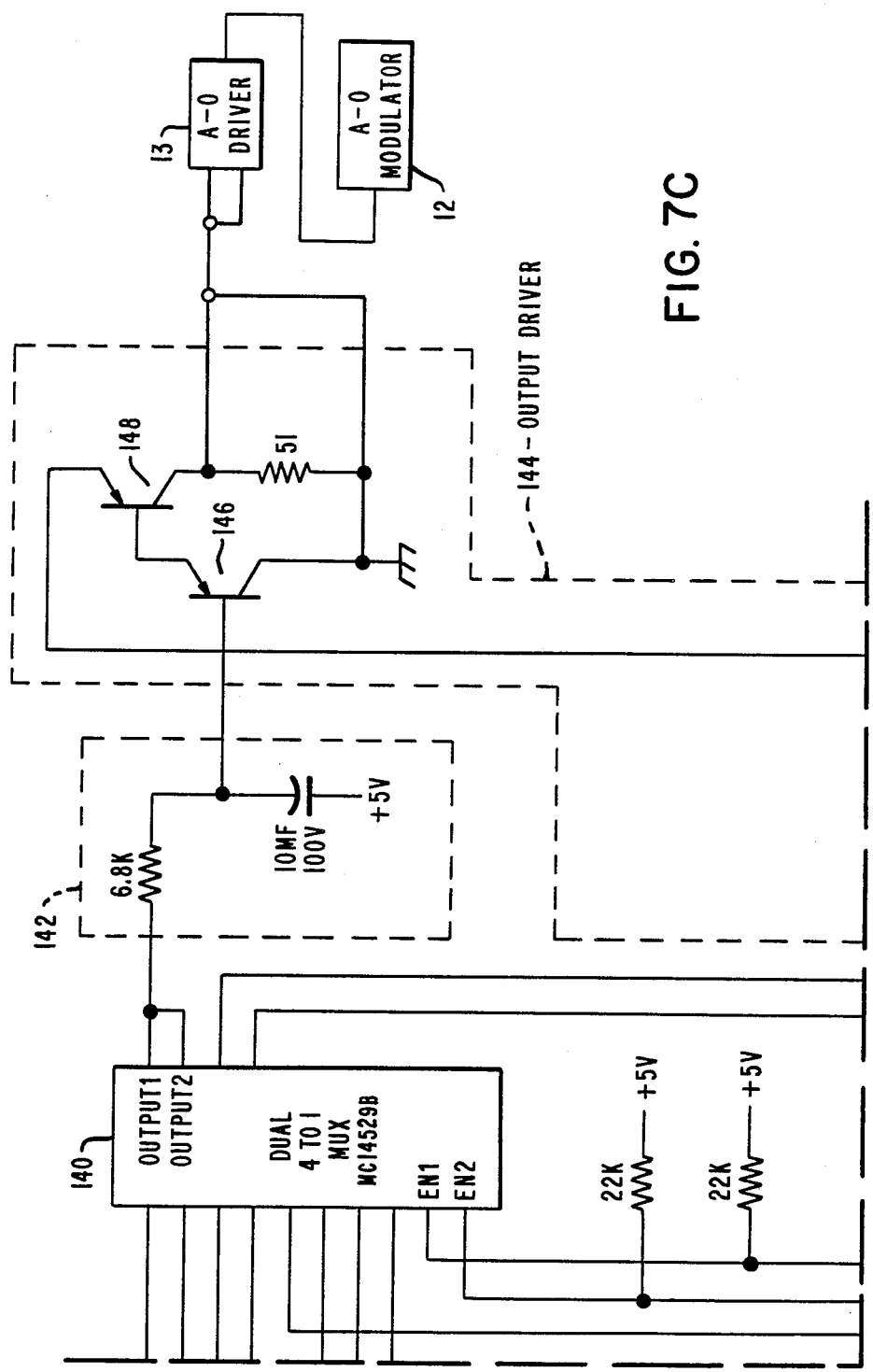
Figure 7D:
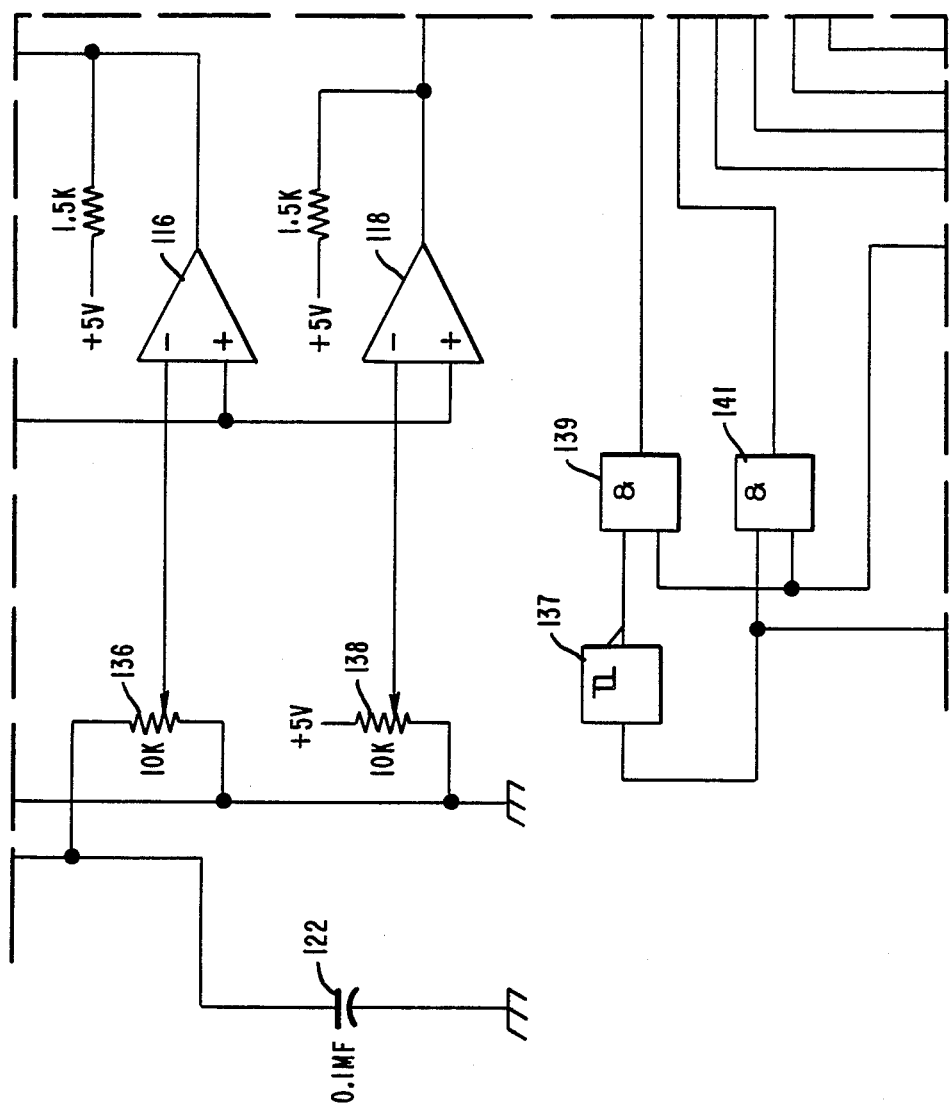
Figure 7F:
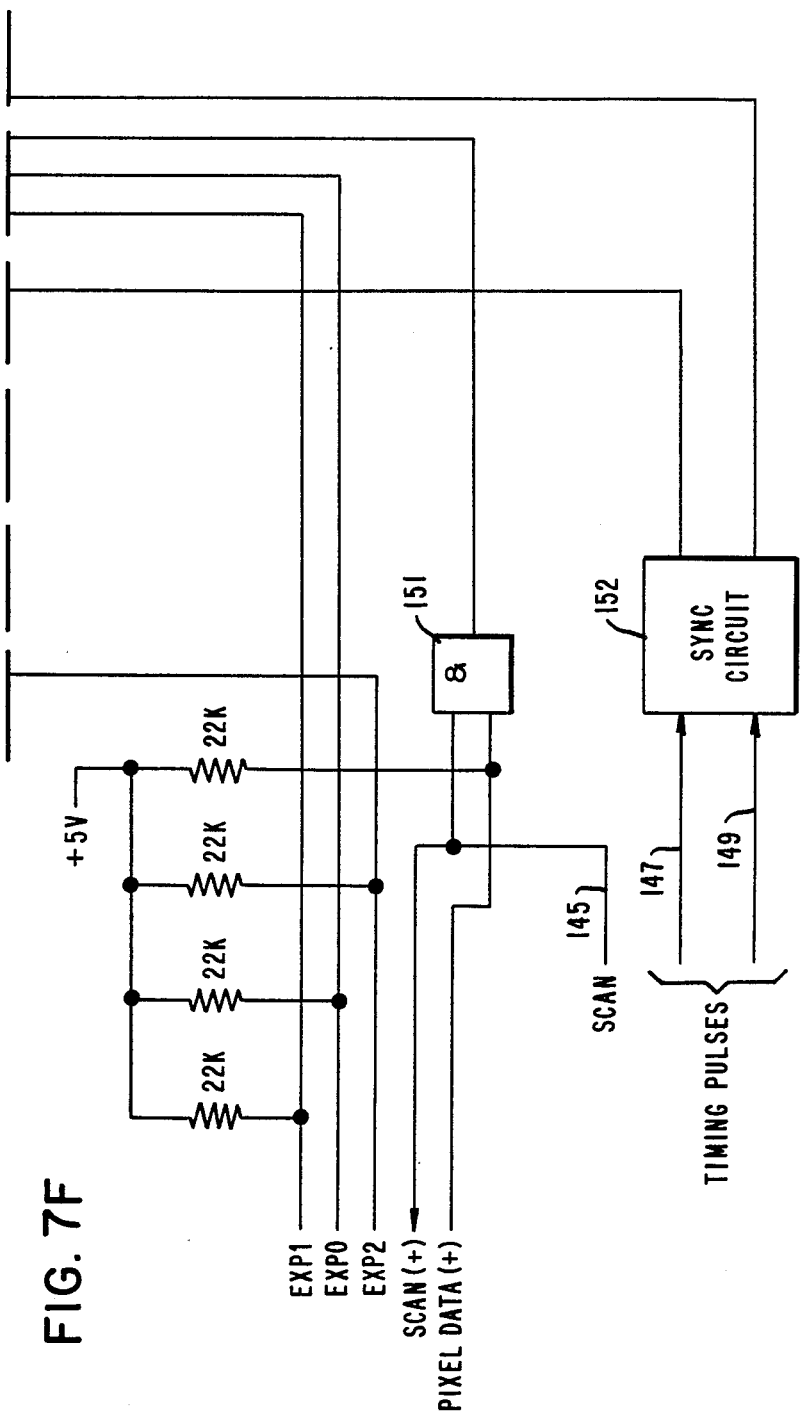

The output of the hold circuit is supplied to the base of an output driver 144 which contains two transistors 146 and 148, such as Motorola MPS4285, connected in a Darlington configuration as shown in FIG. 7C. The output driver buffers the hold circuit such that the held value is not appreciably degraded during the hold period of just over 1 millisecond. As mentioned above, this held value is the operating intensity reference point from which the pixel data modulates the intensity to record, scan by scan, the desired image.

Cascaded within the output driver is a third transistor 150, such as Motorola type MPS4285, which provides another two inputs. Transistor 150 is used as an "OR'ed" current switch. The is the adjustment cycle signal, which is used to turn the laser 10 "ON" continuously in order to adjust the intensity for the 338° non-microfilm scanning portion of each rotation. The clocked pixel data is used via the second input to turn the beam "OFF" or "ON" in a purely binary sense by means of the acousto-optical modulator 12 to build up the recorded image, which is the ultimate object of the intensity control system. The intensity of the modulated write beam when turned "ON" is defined by the value held in the hold circuit 142, which was established by the adjustment cycle of the previous 338° rotation.

Also shown at the top of FIG. 7A is a focus photo transistor 40. During set up with the beam on and with a microfilm sheet positioned above the rotary scanning mirror 46, the beam will reflect off of the microfilm back down to the rotary mirror 46, through the focusing tube 44 and be split by the focus beam-splitter 36, in much the same way that the write beam is split by intensity beam-splitter 24, into a focus beam and a dissipated beam. The focus beam-splitter 36 reflects the focus beam portion of the reflected beam onto photo-transistor transparent body 42 of focus photo-transistor 40 and cause an electrical signal to be generated thereby. Maximizing this output does not produce a perfect focus at the film; however, it is extremely close to a perfect focus and therefore adjusting the focusing tube 44 for the maximum output of the focusing transistor 40 during initial set up provides a method for quickly adjusting the focusing tube 44 to almost its final setting. This, of itself, saves sufficient set up and testing time to justify any added manufacturing costs.

Thus there has been described an intensity controller for an aperture card COM plotter that maintains the operating point of the write beam in reference to a predetermined exposure level for the film type. As will be evident from the foregoing description, certain aspects of the invention are not limited to the particular details of the example illustrated, and it is therefore contemplated that other modifications or applications will occur to those skilled in the art, and it is accordingly attended that the claims will cover all such modifications and applications as do not depart from the true spirit and script of the invention.

What is claimed is:

1. An intensity controller for a high resolution, laser plotter comprising:
   a laser light source emitting a light beam having a randomly varying polarization direction at any time;
   acousto-optical modulator means for modulating said light beam into a modulated beam;
   isotropic beam-splitter means for splitting said modulated beam into a wire beam and a reference beam;
   said beam-splitter means having an inherent polarization sensitivity responsive to said randomly varying polarization;
   light sensing means, for generating a signal proportional to the reference beam intensity, mounted in the path of the reference beam;
   a hold circuit connected to and tracking said reference beam intensity signal; and
   a driver circuit means, having an input connected to said hold circuit and an output connected to said acousto-optical modulator means for driving said acousto-optical modulator means to provide said modulated beam with a controlled intensity.

2. An intensity controller for a laser plotter comprising:
   a laser light source emitting a light beam;
   acousto-optical modulator means for modulating said light beam into a modulated beam;
   front-surface beam-splitter means made from a material having an inherent polarization reflectivity for splitting said modulated beam into a write beam and a reference beam;
   said front-surface beam-splitter oriented to form a predetermined first angle between a direction vertical to said front surface and said modulated beam and to form a predetermined second angle between the direction vertical to said front surface and said write beam, the sum of the predetermined first angle and the predetermined second angle being an oblique angle;
   light sensing means for generating a signal proportional to the reference beam intensity mounted in the path of said reference beam;
   a hold circuit connected to and tracking said reference beam intensity signal; and
   a driver circuit means, having an input connected to said hold circuit and an output acousto-optical modulator means for driving said acousto-optical modulator means to provide said modulated beam with a controlled intensity.

3. An intensity controller for a high resolution, laser plotter, as set forth in claim 1, wherein said isotropic, beam-splitter means comprises a flat, transparent material including:
   a first surface where the modulated beam is split into the reference beam which is reflected off of said first surface and the write beam which is transmitted through said transparent material; and
   a second surface where said write beam exits said transparent material.

4. An intensity controller for a high resolution, laser plotter, as set forth in claim 2, wherein said isotropic, beam-splitter means comprises a flat, transparent material including:
   a first surface where the modulated beam is split into the reference beam which is reflected off of said first surface and the write beam which is transmitted through said transparent material; and
   a second surface where said write beam exits said transparent material.

5. An intensity controller for a high resolution, laser plotter, as set forth in claim 3, wherein said modulated beam enters said first surface at an angle of incidence of substantially 12° from a vertical direction.

6. An intensity controller for a high resolution, laser plotter, as set forth in claim 4, wherein said modulated beam enters said first surface at an angle of incidence of substantially 12° from a vertical direction.

7. An intensity controller for a high resolution, laser plotter, as set forth in claim 3, wherein said second surface has an anti-reflective coating thereon for reducing reflections as said write beam exits from said second surface.

8. An intensity controller for a high resolution, laser plotter, as set forth in claim 4, wherein said second surface has an anti-reflective coating thereon for reducing reflections as said write beam exits from said second surface.

9. An intensity controller for a high resolution, laser plotter, as set forth in claim 5, wherein said second surface has an anti-reflective coating thereon for reducing reflections as said write beam exits from said second surface.

10. An intensity controller for a laser computer-output-microfilm plotter comprising:
    a laser radiating a coherent light beam;
    an acousto-optical modulator means having an electrical input for modulating said coherent light beam into a zero order beam and a first order beam which are spatially divided;
    said modulated beams each having an intensity which varies proportionally according to said electrical input;
    spatial filter means for transmitting said first order beam and substantially removing all other components of said modulated beam;
    mirror means for reflecting said modulated beams to said spatial filter;
    transparent beam-splitter means for receiving said first order beam after said spatial filter, at an angle of incidence of substantially 12° from a vertical direction and splitting said first order beam into a reference beam portion reflected at 12° from said vertical direction and a writing beam portion transmitted by said transparent beam-splitter means;
    intensity sensor means located along said reference beam path for receiving said reference beam and producing an electrical control signal which is proportional to the intensity thereof;
    focusing means located after said beam-splitter for focusing said writing beam into a very small dot at the microfilm print medium;
    reflective scanning means spinning about an axis which is parallel to said write beam for scanning said write beam across the microfilm;
    synchronizing means connected to said reflective scanning means for controlling the modulation of the write beam as the beam scans across the microfilm;
    a hold circuit means having an input connected to said intensity sensor means and a hold control input connected to said synchronizing means for tracking and controlling the intensity of the modulated beams for the portion of each scan that does not traverse the microfilm and holding that controlled intensity value as an operating point at a hold circuit means output;

comparison means for comparing said operating point to a predetermined operating point of the microfilm; and electronic adjustment means connected to said hold circuit means output into said modulator for adjusting the intensity of said first order modulated beam to substantially the predetermined operating intensity for the microfilm.

11. An intensity for a laser computer-output-microfilm plotter, as set forth in claim 10, further comprising:

a plurality of predetermined operating intensity values, each value corresponding to a different microfilm with different specified characteristics.

12. An intensity controller for a laser computer-output-microfilm plotter, as set forth in claim 10, further comprising:

a second beam-splitter means for splitting said write beam into a focus beam and a dissipated beam after said write beam is reflected back from the microfilm; and a focus intensity sensor means located in the path of said focus beam for providing a maximum sensor signal when the focusing means is substantially focused.

13. An intensity controller for a laser plotter, as set forth in claim 2, wherein said first predetermined angle and said second predetermined angle are selected to substantially reduce the inherent polarization reflectivity of the front-surface beam-splitter.

14. An intensity controller for a laser plotter, as set forth in claim 13, wherein the first predetermined angle and the second predetermined angle are selected such that the polarization reflectivity of the front-surface beam-splitter is less than one-half of the maximum polarization reflectivity for the beam-splitter front surface.

15. An intensity controller for a laser plotter, as set forth in claim 2, wherein the said light beam has a randomly varying proportions that the write beam and the reference beam split into from the modulated beam.

* * * * *

UNITED STATES PATENT AND TRADEMARK OFFICE
CERTIFICATE OF CORRECTION

PATENT NO. : 4,764,778

DATED : August 16, 1988

INVENTOR(S) : Semyon Spektor et al.

It is certified that error appears in the above-identified patent and that said Letters Patent is hereby corrected as shown below:

Column 9, line 9, delete "wire" and substitute --write--.

Column 11, line 11, after the word "intensity", insert --controller--.

Column 12, line 20, after the word "varying", insert --polarization direction at any time causing randomly varying--.

Signed and Sealed this

Twenty-seventh Day of December, 1988

Attest:

DONALD J. QUIGG

*Attesting Officer*     *Commissioner of Patents and Trademarks*